US010493468B2

(12) United States Patent
Pogén

(10) Patent No.: US 10,493,468 B2
(45) Date of Patent: Dec. 3, 2019

(54) CENTRIFUGAL SEPARATOR FOR CLEANING GAS

(71) Applicant: ALFA LAVAL CORPORATE AB, Lund (SE)

(72) Inventor: Mats-Örjan Pogén, Billeberga (SE)

(73) Assignee: ALFA LAVAL CORPORATE AB, Lund (SE)

( * ) Notice: Subject to any disclaimer, the term of this patent is extended or adjusted under 35 U.S.C. 154(b) by 146 days.

(21) Appl. No.: 15/542,785

(22) PCT Filed: Jan. 27, 2016

(86) PCT No.: PCT/EP2016/051673
§ 371 (c)(1),
(2) Date: Jul. 11, 2017

(87) PCT Pub. No.: WO2016/124461
PCT Pub. Date: Aug. 11, 2016

(65) Prior Publication Data
US 2017/0348705 A1    Dec. 7, 2017

(30) Foreign Application Priority Data
Feb. 2, 2015   (EP) .................................. 15153427

(51) Int. Cl.
*B01D 45/12*   (2006.01)
*B04B 5/12*    (2006.01)
(Continued)

(52) U.S. Cl.
CPC .............. *B04B 5/12* (2013.01); *B01D 45/14* (2013.01); *B04B 5/005* (2013.01); *B04B 7/02* (2013.01);
(Continued)

(58) Field of Classification Search
CPC ................ B04B 5/12; B04B 5/005; B04B 11/06; B04B 11/02; B04B 7/02; B04B 2005/125;
(Continued)

(56) References Cited

U.S. PATENT DOCUMENTS

| 1,898,807 A | * | 2/1933 | Barnes | B01D 45/14 |
| | | | | 159/4.01 |
| RE26,986 E | * | 11/1970 | Keith | B04B 1/08 |
| | | | | 494/27 |

(Continued)

FOREIGN PATENT DOCUMENTS

| CN | 102470378 A | 5/2012 |
| CN | 103874832 A | 6/2014 |

(Continued)

OTHER PUBLICATIONS

English translation of the Japanese Office Action, dated Aug. 6, 2018, for Japanese Application No. 2017-540721.
(Continued)

*Primary Examiner* — Dung H Bui
(74) *Attorney, Agent, or Firm* — Birch, Stewart, Kolasch & Birch, LLP

(57) ABSTRACT

A centrifugal separator for cleaning a gas containing liquid impurities includes a stationary casing including a surrounding sidewall, a first end wall and a second end wall which enclose a space through which a gas flow is permitted. The space includes an upper separation chamber and a lower discharge chamber. The separator further includes an inlet extending through the stationary casing and permitting supply of the gas to be cleaned to the separation chamber, a rotating member including a stack of separation discs and being arranged to rotate around an axis of rotation, wherein the stack of separation discs is arranged in the separation chamber and a drive member for rotating the rotating member. The discharge chamber is arranged axially below
(Continued)

the stack of separation discs such that clean gas and separated liquid impurities both enter said discharge chamber after being separated in said stack of separation discs, and further, the separator includes a gas outlet configured to permit discharge of cleaned gas from said stationary casing, wherein the gas outlet includes an outlet opening through the stationary casing and a portion extending from the outlet opening into the discharge chamber. Further, there is a drainage outlet arranged in said discharge chamber and configured to permit discharge of separated liquid impurities from said stationary casing.

18 Claims, 4 Drawing Sheets

(51) Int. Cl.
| | | |
|---|---|---|
| B04B 7/02 | (2006.01) | |
| B04B 11/02 | (2006.01) | |
| B01D 45/14 | (2006.01) | |
| B04B 5/00 | (2006.01) | |
| F01M 13/04 | (2006.01) | |
| B04B 11/06 | (2006.01) | |

(52) U.S. Cl.
CPC ............ *B04B 11/02* (2013.01); *F01M 13/04* (2013.01); *B04B 11/06* (2013.01); *B04B 2005/125* (2013.01); *F01M 2013/0422* (2013.01)

(58) Field of Classification Search
CPC . F01M 13/04; F01M 2013/0422; B01D 45/14
See application file for complete search history.

(56) References Cited

U.S. PATENT DOCUMENTS

| | | | | |
|---|---|---|---|---|
| 6,925,993 | B1* | 8/2005 | Eliasson | B01D 45/16 123/572 |
| 8,657,908 | B2 | 2/2014 | Eliasson | |
| 2003/0233939 | A1 | 12/2003 | Szepessy et al. | |
| 2004/0025482 | A1* | 2/2004 | Borgstrom | B04B 5/005 55/438 |
| 2004/0107681 | A1 | 6/2004 | Carlsson et al. | |
| 2005/0198932 | A1* | 9/2005 | Franzen | B01D 45/14 55/406 |
| 2006/0142135 | A1* | 6/2006 | Hallgren | B01D 45/14 494/24 |
| 2009/0025562 | A1* | 1/2009 | Hallgren | B01D 45/14 96/216 |
| 2011/0180052 | A1* | 7/2011 | Schwandt | F01M 13/04 123/573 |
| 2012/0174537 | A1 | 7/2012 | Törnblom et al. | |
| 2014/0237961 | A1* | 8/2014 | Szepessy | B01D 45/14 55/385.1 |
| 2015/0068172 | A1* | 3/2015 | Andersson Aginger | B01D 45/14 55/385.3 |
| 2015/0075377 | A1 | 3/2015 | Gorbach et al. | |
| 2015/0119226 | A1* | 4/2015 | Pogen | B04B 5/12 494/84 |
| 2017/0072409 | A1 | 3/2017 | Pogén | |

FOREIGN PATENT DOCUMENTS

| | | |
|---|---|---|
| CN | 106457264 A | 2/2017 |
| JP | 2006-75688 A | 3/2006 |
| JP | 2011-67740 A | 4/2011 |
| RU | 2315872 C2 | 1/2008 |
| WO | WO 02/34407 A1 | 5/2002 |
| WO | WO 2011/005160 A1 | 1/2011 |
| WO | WO 2012/152925 A2 | 11/2012 |
| WO | WO 2013/178481 A1 | 12/2013 |
| WO | WO 2014/023592 A2 | 2/2014 |

OTHER PUBLICATIONS

International Search Report, issued in PCT/EP2016/051673, dated Apr. 12, 2016.
Written Opinion of the International Searching Authority, issued in PCT/EP2016/051673, dated Apr. 12, 2016.
English translation of Russian Decision to Grant and Russian Search Report, dated Jun. 9, 2018, for Russian Application No. 2017130904.

* cited by examiner

CENTRIFUGAL SEPARATOR FOR CLEANING GAS

FIELD OF THE INVENTION

The present invention relates to the field of centrifugal separators for cleaning a gas containing liquid impurities. In particular, the present invention relates to cleaning crankcase gases of a combustion engine from oil particles.

BACKGROUND OF THE INVENTION

It is well known that a mixture of fluids having different densities may be separated from one another through use of a centrifugal separator. One specific use of such a separator is in the separation of oil from gas vented from a crank case forming part of an internal combustion engine.

With regard to this specific use of separators, there can be a tendency for the high pressure gasses found in the combustion chambers of an internal combustion engine to leak past the associated piston rings and into the crank casing of the engine. This continuous leaking of gas into the crank case can lead to an undesirable increase of pressure within the crank case and, as a consequence, to a need to vent gas from the casing. Such gas vented from the crank casing typically carries a quantity of engine oil (as droplets or a fine mist), which is picked up from the reservoir of oil held in the crank casing.

In order to allow vented gas to be introduced into the inlet system without also introducing unwanted oil (particularly into a turbocharging system wherein the efficiency of the compressor can be adversely affected by the presence of oil), it is necessary to clean the vented gas (i.e. to remove the oil carried by the gas) prior to the gas being introduced into the inlet system. This cleaning process may be undertaken by a centrifugal separator, which is mounted on or adjacent the crank case and which directs cleaned gas to the inlet system and directs separated oil back to the crank case. An example of such a separator is disclosed e.g. in U.S. Pat. No. 8,657,908.

However, when the centrifugal separator is used for cleaning crankcase gases from smaller combustion engines, such as smaller diesel engines used especially in lighter trucks and the like, there is a need for a separator that does not have a relatively large size requiring a large space. One way of reducing the size of the centrifugal separator is to reduce the diameter of the stack of separation disks. However, in order to maintain the separation efficiency, the height or the length of the stack then has to be increased.

Furthermore, an issue may also be to keep once separated particles from re-entering into the cleaned gas after the separation in e.g. a disc stack of the centrifugal separator.

There is thus a need in the art for centrifugal separators having a reduced or compact size while maintaining or improving the separation efficiency.

SUMMARY OF THE INVENTION

A main object of the present invention is to provide a centrifugal separator that may be reduced in size but still maintain god separation efficiency.

A further object of the present invention is to provide a centrifugal separator that reduces the number of parts of the separator.

As a first aspect of the invention, there is provided a centrifugal separator for cleaning a gas containing liquid impurities, wherein the centrifugal separator comprises a stationary casing comprising a surrounding side wall, a first end wall and a second end wall which enclose a space through which a gas flow is permitted, the space comprising an upper separation chamber and a lower discharge chamber, an inlet extending through the stationary casing and permitting supply of the gas to be cleaned to the separation chamber, a rotating member comprising a stack of separation discs and being arranged to rotate around an axis (X) of rotation, wherein the stack of separation discs is arranged in the separation chamber, a drive member for rotating the rotating member, characterized in that the discharge chamber is arranged axially below the stack of separation discs such that clean gas and separated liquid impurities both enter the discharge chamber after being separated in the stack of separation discs, and further wherein the separator comprises a gas outlet configured to permit discharge of cleaned gas from the stationary casing, wherein the gas outlet comprises an outlet opening through the stationary casing and a portion extending from the outlet opening into the discharge chamber, and a drainage outlet arranged in the discharge chamber and configured to permit discharge of separated liquid impurities from the stationary casing.

The stationary casing may have a cylindrical shape with circular cross-section having a radius R from the axis (X) of rotation to the surrounding side wall. This radius may be constant at least with respect to a major part of the circumference of the surrounding side wall. The first end wall may thus form an upper end of the cylindrical shape and the second end wall may form a lower end of the cylindrical shape.

The stationary casing of the centrifugal separator encloses a space, and the space comprises an upper separation chamber and a lower discharge chamber. The upper separation chamber is thus the portion or volume within the stationary casing in which the primary separation of liquid impurities from the gas occurs, and thus comprises the stack of separation discs. "Upper" is the axial portion or volume by the first end wall, whereas "lower" is the axial portion or volume by the second end wall. The lower discharge chamber is arranged axially below the separation discs and located within the stationary casing such that clean gas and liquid impurities both enter the discharge chamber after the primary separation within the stack of separation discs. The discharge chamber is thus downstream the separation chamber. Cleaned gas are directed from the separation discs in the separation chamber to the discharge chamber and liquid impurities are directed, e.g. by flowing by means of gravity on the inner surface of the stationary casing, to the same discharge chamber after leaving the separation discs. The clean gas exits from the discharge chamber via the portion of the gas outlet extending into the discharge chamber, whereas liquid impurities exit the discharge chamber via the drainage outlet.

The inlet of the centrifugal separator may be located through the first end wall or through the surrounding side wall close to the first end wall, thus at the top of the separator such that gas entering through the inlet enters the separation chamber, whereas the drainage outlet may be located in the second end wall, thus at the bottom of the separator within the discharge chamber.

The rotating member may define a central space formed by at least one hole in each of the separation discs and connected to the inlet and configured to convey the gas to be cleaned from the inlet to the gaps of the stack of separation discs. Thus, gas to be cleaned is directed through the stack of separation discs.

The separation discs of the stack may be frustoconical. A frustoconical disc may have a planar portion extending in a plane that is perpendicular to the axis of rotation, and a frustoconical portion. The planar portion may be closer to the rotational axis than the frustoconical portion. Further, the discs of the stack may be radial discs, in which substantially the whole disc extends in a plane that is perpendicular to the axis of rotation.

It is also to be understood that the separation discs not necessarily have to be arranged in a stack. The separation chamber may for example comprise axial discs, or plates that extend around the axis of rotation. The axial discs or plates may be planar, i.e. extending in planes that are parallel to the axis of rotation. The axial discs or plates may also have a slightly or significantly curved shape, such as an arcuate or spiral shape, as seen in a radial plane.

The drive member may for example comprise a turbine wheel, rotated by means of an oil jet from the oil system of the combustion engine or a free jet wheel comprising a blow-back disk. However, the drive member may also be independent of the combustion engine and comprise an electric motor, a hydraulic motor or a pneumatic motor.

The drainage outlet may be formed by a number of spot shaped through holes of the stationary casing. The drainage outlet may be arranged centrally in the second end wall, such as at the axis of rotation or centered around the axis of rotation.

The gas outlet comprises a portion that extends into the discharge chamber of the stationary casing and an outlet opening through the stationary casing. The portion that extends into the discharge chamber may be formed as a sleeve, i.e. may be a sleeve portion. The portion extending into the discharge chamber may further be a stationary portion, i.e. arranged not to co-rotate with the rotating member. The portion may extend into the discharge chamber in a direction substantially perpendicular to the axis (X) of rotation. Clean gas is thus directed via this portion to the outlet opening. In other words, the portion extending into the discharge chamber is upstream the outlet opening.

The portion extending into the discharge chamber is arranged so as to permit evacuation of clean gas from a "spot volume" of the discharge chamber, i.e. discharging clean gas from a discrete volume of the discharge chamber. This is achieved e.g. by means of an opening in the outer wall of the portion extending into the discharge chamber. Such an opening may thus located in the discharge chamber at the "spot" or discrete volume from which one wishes to withdraw the clean gas. Such a solution is advantageous in that it decreases the risk of contaminating the clean gas with separated oil, i.e. decreases the risk of remixing clean gas with oil, before discharging clean gas from the discharge chamber.

The present invention is based on the insight that by using a portion that extends into the separation space, the cleaned gas and the separated impurities may be discharged from the same chamber, or sub-space, of the stationary casing. Prior art separators, such as a separator disclosed in U.S. Pat. No. 8,657,908, usually have a housing insert in the stationary casing that function to segregate separated oil from cleaned gas prior to the separated oil and cleaned gas exiting the rotor housing. Such a housing insert may comprise an annular ditch or slit, which during use of the separator collects separated oil droplets which are thrown from the separator discs and run downwards on the interior of the stationary casing under the action of gravity. Oil collected in the ditch of the housing insert then flows so as to pass into a region enclosed by an underside of the housing insert, from which it is then discharged. The separator of the present invention does not need to use such a housing insert, but the gas and the separated oil may be collected from the same portion of the separation space. In other words, in prior art separators comprising a housing insert, cleaned gas and separated impurities are segregated as quickly as possible after leaving the primary separation in the separator discs by means of walls and different flow direction, whereas according to the present invention, the cleaned gas and the separated impurities may be in the same portion of the separation space until they are discharged from the stationary casing via the gas outlet and the drainage outlet.

Accordingly, in embodiments of the first aspect of the invention, separated liquid impurities and clean gas are not separated by means of any physical object, such as a wall or a ditch, after the primary separation in the stack of separation discs and before being discharged from the stationary casing.

In embodiments of the first aspect of the invention, the discharge chamber is free of any further walls, such as walls extending in the axial direction, that further separate liquid impurities from the clean gas.

The inventor has found that the present invention may cause less gas resistance than a separator having a housing insert, thereby reducing the power input. Further, by not having a housing insert for segregating separated liquid impurities and clean gas after leaving the separation discs, the invention dramatically reduces the number of parts of the separator, which both reduces material and assembly costs. This may in turn provide for a separator having a reduced height as compared to a separator having a housing insert.

It is to be noted that the centrifugal separator is also suitable for cleaning gases from other sources than combustion engines, for instance the environment of machine tools which frequently contains large amounts of liquid impurities in the form of oil droplets or oil mist.

In embodiments of the first aspect of the invention, the rotating member further comprises a lower flange arranged axially below the portion of the gas outlet extending from the outlet opening into the discharge chamber. In the present disclosure, "axially" refers to the direction along the rotational axis X The lower flange may be arranged axially below the drainage outlet or axially above the drainage outlet.

The inventor has found that the lower flange, located axially below the portion of the gas outlet extending into the discharge chamber, may prevent separated impurities, such as oil, from splashing up into the cleaned gas and it may further aid in draining any contaminating oil, such as oil from the turbine wheel, from the discharge chamber.

Further, by having a lower flange that rotates, a swirl is created that aids in forcing the separated oil towards the drainage outlet located close to the axis of rotation, such as centered around the axis of rotation.

The lower flange, being a part of the rotor, is arranged to rotate around the axis (X) of rotation. The lower flange may thus be disc-shaped and centered around the axis (X) of rotation. The lower flange may also be arranged axially between the drainage outlet and the portion of the gas outlet extending from the outlet opening into the discharge chamber. If the inlet is arranged in an upper end wall and the drainage outlet is arranged in the bottom end wall, the lower flange is thus arranged axially below the portion of the gas outlet extending into the discharge chamber but above the drainage outlet. The lower flange may be arranged closer to the drainage outlet than to the portion of the gas outlet extending into the discharge chamber. As an example, the lower flange may be located axially just above the drainage outlet, such that it allows separated impurities to be directed along the inner surface of the second end wall. As an example, the lower flange may be located about 1-15 mm above the drainage outlet, such as about 3-10 mm above the drainage outlet.

In embodiments of the first aspect of the invention, the lower flange has a radius that is smaller than the radius of the stack of separation discs. This may be an advantage in that it provides for having a separator that is tilted, i.e. in applications in which rotational axis (X) is tilted as compared to a vertical axis. This is because with a larger amount of oil present in a tilted separator, a large flange risk being below the oil level, thereby decreasing the speed or revolutions per minute, of the separator. A lower flange having a radius that is smaller than the radius of the stack of separation discs may thus avoid such disadvantages.

As an example, the radius of the lower flange may be about half of the radius of the disc stack. If the drainage outlet is arranged around the rotational axis (X), the radius of the lower flange may be larger than the distance from the axis (X) to the drainage outlet. In this way, the flange axially "covers" the drainage outlet.

In embodiments of the first aspect of the invention, the rotating member further comprises an upper flange arranged axially between the portion of the gas outlet extending into the discharge chamber and the disc stack.

An upper flange arranged axially between the portion of the gas outlet extending into the discharge chamber and the disc stack reduces the risk of separated particles from entering the gas outlet. The portion of the gas outlet thus extends from the stationary casing, e.g. extending in a direction perpendicular to the axis of rotation, axially between the lower and upper flange.

By having a rotating upper flange, aerosols that actually come in contact with the lower end plate of the stack of separation discs to be thrown at the surrounding inner wall of the stationary casing. Furthermore, the upper and lower flange rotating during operation of the separator may aid in creating turbulence around the portion of the gas outlet extending from the outlet opening into the discharge chamber, thereby decreasing the risk of oil contaminating the clean gas.

The upper flange may be disc shaped and thus rotates together with the lower flange, and since they for a part of the rotor, they also rotate with the disc stack.

As an example, the upper flange may have a radius that is larger than the radius of the lower flange. As an example, the radius may be about twice as large as the radius of the lower flange. The radius of the lower flange may be substantially the same as the radius of the discs in the disc stack.

Furthermore, the upper and lower flange may be arranged in a single unit. The single unit may further comprise a frustoconical portion onto which the disc stack is arranged. The single unit may form a "rotating secondary divider", as seen in FIGS. 2 and 3 of the present disclosure. The frustoconical portion may thus have a similar size as a separation disc. The upper flange may be a flange of such a frustoconical portion, whereas the lower flange may be arranged as the lowest end part of the single unit. The frustoconical portion may thus. The surface of the frustoconical portion onto which the disc stack is arranged may comprise distance members such as spot formed caulks. In this way, a small separation space also is formed between the lowest disc of the disc stack and the surface of the frustoconical portion, which means that the frustoconical portion also functions as the lowest disc of the disc stack. As an example, the frustoconical portion may be arranged such that its inner surface faces the disc stack, and this inner surface may comprise the distance members.

In embodiments of the first aspect of the invention, the portion of the gas outlet portion of the gas outlet extending from the outlet opening into the discharge chamber is hollow and comprises an opening in the peripheral wall through which the cleaned gas is retrieved and directed to the outlet opening through the stationary casing.

If the portion of the gas outlet extends in a direction D from the outlet opening into the discharge chamber, the opening in the peripheral wall is thus an opening located such that gas flowing through such an opening to the hollow interior flows in a direction that is not parallel to D. In other words, the portion extending into the discharge chamber still has an "end wall" substantially opposite the outlet opening through the stationary casing, and the opening in the peripheral wall is thus an opening in any of the walls of the portion extending into the discharge chamber from the stationary casing.

Such a configuration of the portion extending into the discharge chamber permits evacuation of clean gas from a "spot volume" of the discharge chamber, i.e. by means of the opening in the peripheral wall. Thus, the portion extending into the discharge chamber may be tubular with a "sleeve" opening in the surrounding wall. The opening may thus be in the wall that encloses the hollow interior and extends from the outlet opening to the end wall. The sleeve opening may be located in the peripheral, or surrounding, wall close to the end wall.

The opening in the peripheral wall is arranged such that clean gas may enter the hollow interior of the portion extending into the discharge chamber via the opening.

As an example the portion of the gas outlet may extend into the stationary casing such that the opening in the peripheral wall is located on a radius from rotational axis (X) that is less than half of the total radius of the stationary casing. Thus, the portion may extend to such degree that clean gas is retrieved close to the center of the separation space. This is advantageous in that it avoids withdrawing gas close to the surrounding inner wall of the stationary casing since this wall usually is covered with separated oil during operation.

The portion extending into the discharge chamber of the gas outlet may thus have a length that is similar to the radius of the stationary casing. In embodiments, the portion extending into the discharge chamber has a length that is longer than the radius of the stationary casing. This may aid in retrieving clean gas via the opening as close to the centre as possible.

The opening in the peripheral wall may have an area that is approximately the same as the area of the inner cross-sectional area of the portion extending into the discharge chamber. This is to avoid any possible pressure losses.

As an example, the opening in the peripheral wall of the portion may face the rotational axis (X).

In a further example, the opening in the peripheral wall of the portion faces away from the rotational axis.

This is advantageous in that it may prevent any oil that has stuck on the surface of the portion extending into the discharge chamber, at the part facing the rotational axis, from entering the opening in the peripheral wall during operation of the separator.

The opening in the peripheral wall may be directed away from the rotational axis in a direction that is approximately perpendicular to the rotational axis (X), i.e. directed such that it faces the stationary casing.

In another example, the opening in the peripheral wall is directed away from the rotational axis in a direction that is between 15 and 60 degrees relative the rotational axis, such as approximately 45 degrees relative the rotational axis.

The opening in the peripheral wall may be directed upwards in a direction that is between 15 and 60 degrees relative the rotational axis, such as approximately 45 degrees relative the rotational axis. "Upwards" means in the direction towards the disc stack and the first end wall of the stationary casing, i.e. away from the second end wall of the stationary casing. Having an opening directed upwards in a direction that is between 15 and 60 degrees relative the rotational axis, such as approximately 45 degrees relative the rotational axis, may be advantageous in that it may decrease the risk of having any oil stuck on the surface of the portion extending into the discharge chamber from entering the opening in the peripheral wall.

In embodiments of the first aspect of the invention, the portion of the gas outlet extending into the discharge chamber comprises a tubular part and a narrowing part, wherein the tubular part is arranged at the outlet opening through the stationary casing and the narrowing part comprises the opening in the peripheral wall and wherein the narrowing part is arranged further away from the outlet opening through the stationary casing compared to the tubular part.

The tubular part and the narrowing part may be about equal in length. The narrowing part has thus a diameter that is less than the tubular part, and may have its narrowest part furthest away from the tubular part.

It may be advantageous to have a portion having a narrow part furthest into the separation space, since this may facilitate a better air flow of gas through the separation space. As an example, it may avoid pressure losses in the gas being discharged from the discharge chamber. Further, a narrowing part decreases the area exposed to any oil splashes within the discharge chamber.

As an example, the narrowing part may comprises and end wall extending in a plane formed by the rotational axis (X) and the radius from the rotational axis (X).

The end wall is thus furthest away from the outlet opening, and may thus be oriented such as to obstruct the gas flowing in a circular direction in the separation space. This may be advantageous in that it further prevents separated oil drops from entering the opening in the portion extending into the discharge chamber together with the clean gas. The end wall may further aid in creating a small pressure drop, which may aid in gathering and diverting any oil from the opening in the portion extending into the discharge chamber.

In embodiments of the first aspect of the invention, the portion extending into the discharge chamber comprises a drainage hole through the peripheral wall.

The drainage hole may extend through the peripheral wall of the sleeve portion downstream from the larger opening through which clean gas is retrieved from the discharge chamber. In this way, any oil that has contaminated the gas discharged through the portion extending into the discharge chamber may be drained. Such a drainage hole may have an area that is smaller than the area of the opening of the peripheral wall through which clean gas is retrieved. The area may be at least five times smaller, such as at least ten times smaller than the area of the opening of the peripheral wall through which clean gas is retrieved.

As a second aspect of the invention, there is provided a method for cleaning a gas containing liquid impurities comprising the steps of
   providing a centrifugal separator according to the first aspect of the invention;
   introducing gas containing liquid impurities into the inlet of the centrifugal separator; and
   discharging clean gas through the gas outlet and discharging liquid impurities separated from the gas through the drainage outlet.

Terms and definitions used in relation to the second aspect of the invention are as discussed in relation to the first aspect of the invention above. The clean gas may thus be discharged close to the rotational axis of the centrifugal separator. The step of providing a centrifugal separator also comprises rotating the rotating member of the centrifugal separator.

In embodiments of the second aspect, the gas containing liquid impurities is crankcase gas of a combustion engine and the liquid impurities comprises oil.

DETAILED DESCRIPTION

The centrifugal separator according to the present disclosure will be further illustrated by the following description of an embodiment with reference to the accompanying drawings.

Figure 1:
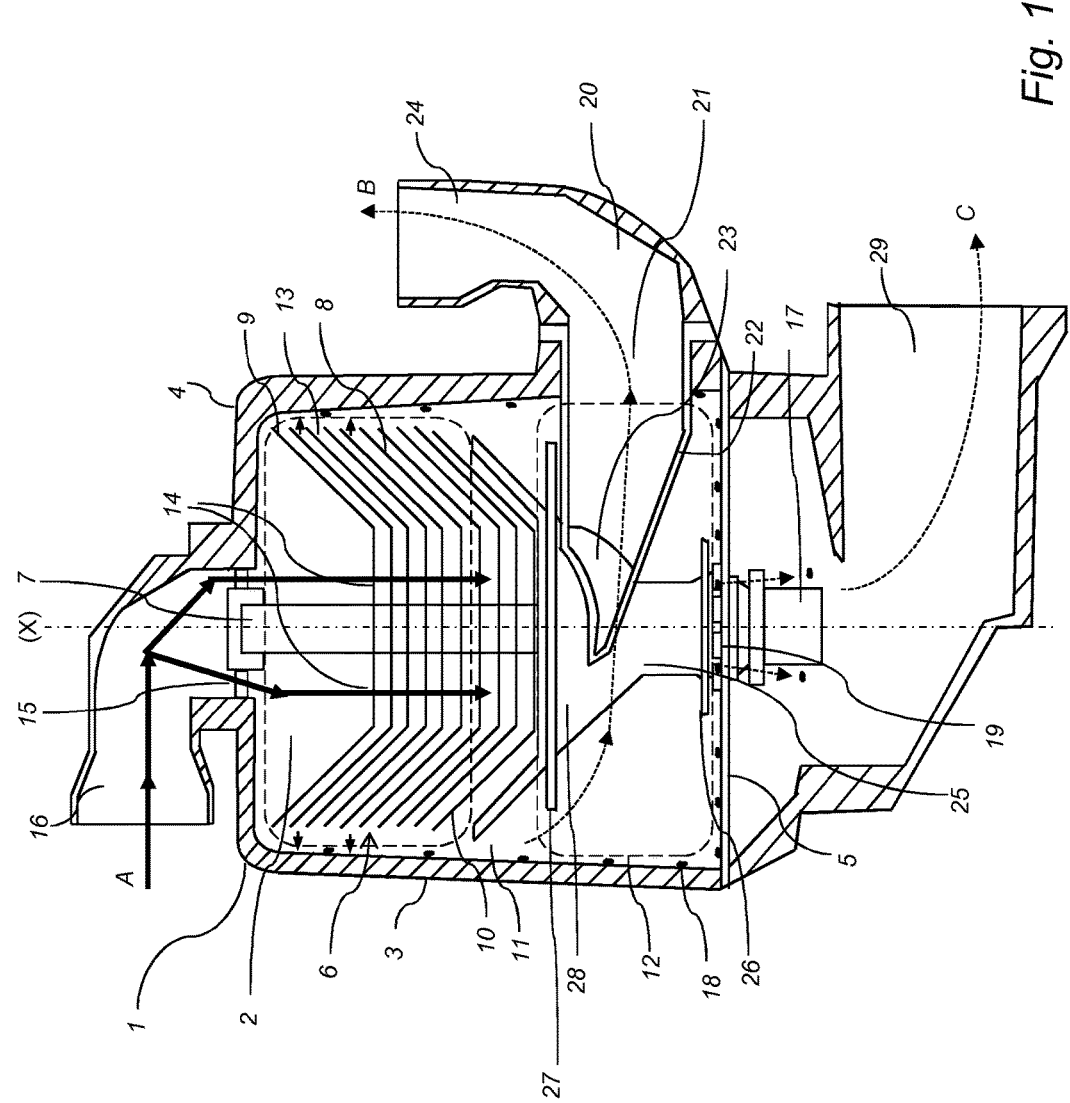
FIG. 1 shows a schematic drawing of a section of a centrifugal separator of the present disclosure.

FIG. 1 shows a schematic section view of a centrifugal separator according to an embodiment of the present disclosure. The centrifugal separator comprises a stationary casing 1, which is configured to be mounted to a combustion engine (not disclosed), especially a diesel engine, at a suitable position, such as on top of the combustion engine or at the side of the combustion engine. The stationary casing 1 encloses a separation space 2 through which a gas flow is permitted. The stationary casing 1 comprises, or is formed by, a surrounding side wall 3, a first end wall 4 (in the embodiments disclosed an upper end wall) and a second end wall 5 (in the embodiments disclosed a lower end wall). The surrounding side wall 3 has a circular cross-section with a radius R from the axis (X) of rotation to the surrounding side wall 3, which is more or less constant at least with respect to a major part of the circumference of the surrounding side wall 3. In particular, the side wall 3 is circular cylindrical. The centrifugal separator comprises a rotating member 6 which is arranged to rotate around an axis (X) of rotation. It should be noted that the stationary casing 1 is stationary in relation to the rotating member 6, and preferably in relation to the combustion engine to which it may be mounted.

The rotating member 6 comprises a spindle 7 and a stack of separation discs 8 attached to the spindle 7. All the separation discs 8 of the stack of separation discs 8 are provided between a first end plate 9 (in the embodiments disclosed an upper end plate) and a second end plate 10 (in the embodiments disclosed a lower end plate). Each separation disc 8 may be made of plastics or metal. The number of separation discs 8 is normally higher than indicated in FIG. 1 and may be for instance 50 to 100 separation discs 8 depending on the size of the centrifugal separator.

The spindle 7, and thus the rotating member 6, is rotatably supported in the stationary casing 1 by means of a first, upper bearing (not shown) and a second bearing (not shown).

The separation discs 8 are conical and extend upwardly and outwardly from the spindle 7. It should be noted that the separation discs 8 could also extend downwardly and outwardly, or even radially. The separation discs 8 are provided at a distance from each other by means of distance members (not disclosed) in order to form gaps 13 between adjacent separation discs 8, i.e. a gap 13 between each pair of adjacent separation discs 8. The axial thickness of each gap 13 may be in the order of 1-2 mm, for instance.

The rotating member 6 defines a central space 14. The central space 14 may be formed by a hole in each of the separation discs 8. In the embodiments disclosed the central space 14 is formed by a plurality of holes each extending through the first end plate 9 and through each of the separation discs 8.

The centrifugal separator comprises an inlet 15 for the supply of the gas to be cleaned. The inlet 15 extends through the stationary casing 1, and more precisely through the first end wall 4 and into the separation chamber 11 of the stationary casing. The inlet 15 communicates with the central space 14 so that the gas to be cleaned is conveyed from the inlet 15 via the central space 14 to the gaps 13 of the stack of separation discs 8, as indicated by arrows "A" in FIG. 1.

The inlet 15 is configured to communicate with the crankcase of the combustion engine, or any other source, via an inlet conduit 16 permitting the supply of crankcase gas from the crankcase to the inlet 15 and further to the central space 14 and the gaps 13 as explained above. The inlet conduit 16 disclosed may be comprised by the centrifugal separator.

The centrifugal separator comprises a schematically disclosed drive member 17 for rotating the rotating member 6. The drive member 17 is connected to the spindle 7. The drive member 17 may comprise a turbine wheel, see WO2012/152925, rotated by means of an oil jet from the oil system of the combustion engine, or a free jet wheel comprising a blow-back disk, see WO2014/023592, wherein the free jet is provided by the oil system of the combustion engine. Alternatively, the drive member 17 may be independent of the combustion engine and comprise an electric motor, a hydraulic motor or a pneumatic motor.

The separation discs 8 are located in the upper separation chamber 11 of the space enclosed by the stationary casing and in which chamber the primary separation occurs. The liquid impurities of the gas will be separated from the gas in the gaps 13, and the cleaned gas will be conveyed out of the gaps 13 and further to the lower discharge chamber 12 of the space enclosed by the stationary casing. Separated liquid impurities, schematically drawn as small oil droplets 18, tend to flow on the inner surface of the surrounding wall down to the lower discharge chamber 12.

Cleaned gas and separated impurities are both discharged from the same volume, i.e. the lower discharge chamber 12. The centrifugal separator comprises a drainage outlet 19 configured to permit discharge of liquid impurities separated from the gas. The drainage outlet 19 is arranged in the end wall 5 and surrounding the rotational axis (X). The drainage outlet may thus be in the form of a slot or slit below the lower flange 26.

Liquid impurities discharged via the drainage outlet 19 may further be led out of the separator by a liquid outlet 29, as schematically shown by arrow "C" in FIG. 1.

The centrifugal separator also comprises a gas outlet 20 configured to permit discharge of cleaned gas, as schematically shown by arrow "B" in FIG. 1.

The gas outlet 20 comprises an outlet opening 21 in the stationary casing 1, and in the embodiments disclosed in the side wall 3 of the stationary casing 1. The gas outlet 20 further comprises a portion extending into the discharge chamber 22, having an opening in the peripheral wall 23, such that the cleaned gas may be discharged via the portion extending into the discharge chamber to the outlet conduit 24 of the gas outlet. The outlet conduit 28 may advantageously recirculate the cleaned gas, for instance to the inlet side of the combustion engine.

As seen in FIG. 1, the portion extending into the discharge chamber 22 extends into the discharge chamber 12 to an extent such that the opening in the peripheral wall 23 is located close to the rotational axis X, such as extending to an extent such that the opening in the peripheral wall is arranged at a distance from the rotational axis (X) that is less than half of the radius from the rotational axis to the stationary casing 1.

FIG. 1 thus shows that both the clean gas and the liquid impurities are discharged from the same discharge chamber 12 of the space enclosed by the stationary casing. In other words, clean gas and liquid impurities does not have to be further separated by means of any walls arranged in the separation space 2 after the primary separation within the gaps 13 between the separation discs 8. The rotating member 6 further comprises a single unit 25, a "rotating secondary divider", arranged in the discharge chamber of the separation space 2. The single unit 25 comprises a lower flange 26, which is arranged axially above drainage outlet 19, so as to prevent liquid impurities from splashing up into the clean gas that enters the opening in the peripheral wall 23. As an example, the lower flange 26 may be arranged a few millimeters above the drainage outlet 19, such as about 1-10 mm above drainage outlet 19, such as about 3-10 mm above drainage outlet 19. The single unit has further a frustoconical upper part 28, onto which the lower end plate 10 is arranged. On the frustoconical part 28, an upper flange 27 is arranged, such that the portion extending into the discharge chamber 22 of the gas outlet 20 extends into the discharge chamber 12 of the separation space 2 axially between the lower flange 26 and the upper flange 27. Both upper flange 27 and lower flange 26 are circular, but the radius of the lower flange 26 is about half of the radius of the upper flange 27. The upper flange 27 has a radius that is about the same as the radius of the separation discs 8 and further prevents separated liquid impurities from contaminating clean gas that are discharged via the portion extending into the discharge chamber 22.

Figure 2:
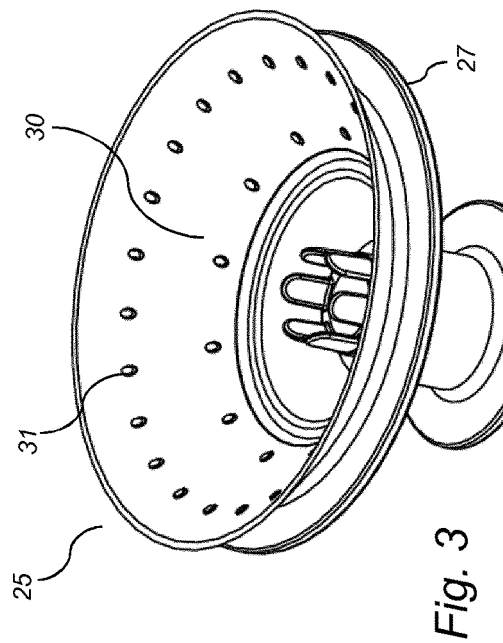
FIG. 2 shows a side view of a rotating secondary divider according to an embodiment of the present disclosure.
Figure 3:
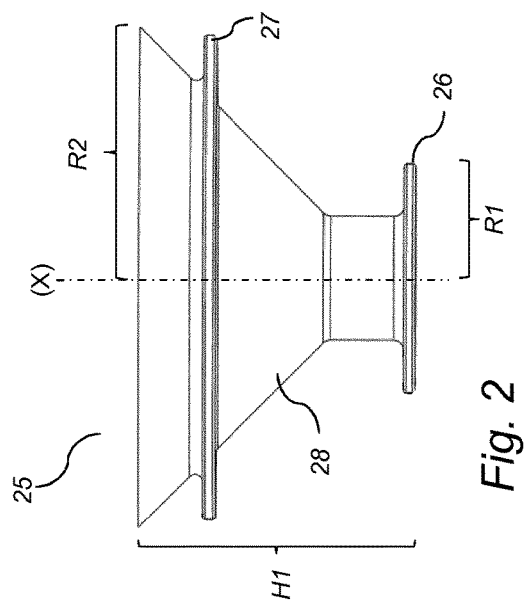
FIG. 3 shows a perspective view of a secondary divider according to an embodiment of the present disclosure.

FIG. 2 and FIG. 3 show the single unit 25 that is arranged to rotate with the rotating member 6 and around rotational axis (X). The single unit 25 comprises a frustoconical portion 28 that has a height in the axial direction that is more than half of the total axial height H1 of the single unit. The frustoconical portion 28 is arranged with the widest part facing upwards towards the separation discs (not shown in FIG. 2), and accordingly extend in the same direction as the separation discs, which in the embodiment shown in the Figures is upwardly and outwardly from the rotational axis (X). The single unit 25 further comprises a lower flange 26, arranged at the end surface of the single unit 25 that is not formed by the frustoconical portion, and an upper flange 27, arranged on the conical portion 28. Both flanges 26 and 27 are circular and extend in a direction perpendicular to the rotational axis (X). The radius of the lower flange 26, denoted R1 in FIG. 2, is smaller than the radius of the upper flange 27, denoted R2 in FIG. 2. As an example, R1 may be about half the distance of R2. The radius R2 may approximately be the same as the radius of the separation discs.

The frustoconical portion 28 has an inner surface 30 onto which the stack of separation discs is arranged. Thus, the lower end plate 10 of the disc stack in FIG. 1 is arranged on inner surface 30. This inner surface 30 has distance members 31, in this case in the form of spot-formed distance members, so as to create a gap also between the lower end plate 10 and the inner surface 30 of the frustoconical portion. In this way also this gap aids in the separation of liquid impurities from the gas.

Figure 4:
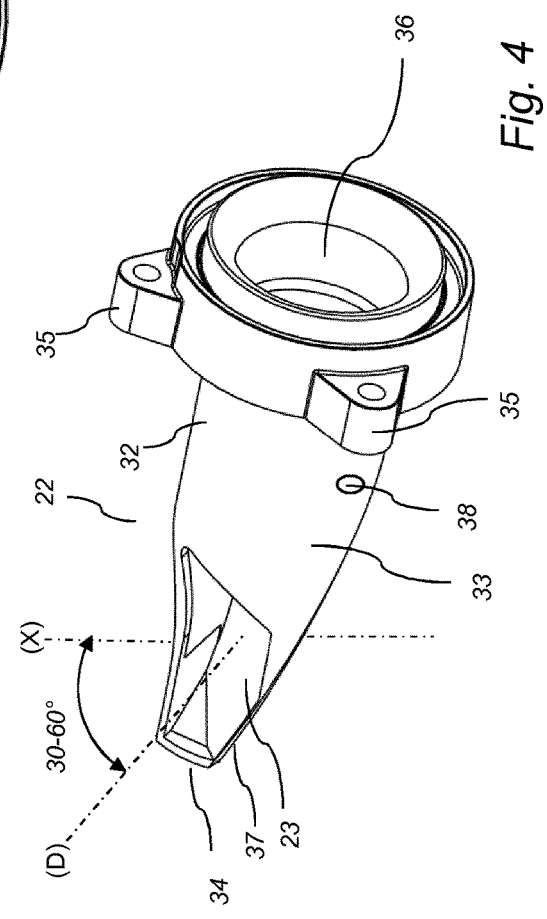
FIG. 4 shows a perspective view of a portion extending into the discharge chamber according to an embodiment of the present disclosure.

FIG. 4 shows the portion extending into the discharge chamber 22 of the gas outlet. The portion extending into the discharge chamber has a hollow interior 36 and comprises a tubular portion 32 and a narrowing part 33. The narrowing part is arranged at the end of the portion extending into the discharge chamber 22 that extends furthest into the separation space 2. There is an opening in the peripheral wall 23 of the narrowing part so as to allow gas to flow from the exterior of the portion extending into the discharge chamber to the hollow interior 36. This opening in the peripheral wall 23 is oriented so that it faces away from the rotational axis (X). When arranged in the centrifugal separator, the opening in the peripheral wall 23 faces away from the rotational axis (x) upwards, i.e. away from lower end wall 5, in a direction D that forms an angle with the rotational axis (x) that is e.g. between 30 and 60 degrees, such as approximately 45 degrees, as seen in FIG. 3. The narrowing part 33 has an end wall 34 that is oriented in a plane that is formed by the rotational axis (X) and the radius from rotational axis (X). This end wall 34 has thus an area that is smaller than the area of the tubular portion 32 of the portion extending into the discharge chamber 22. The outer wall has a slight curvature 37, which means that it is slightly curved inwards when it meets with end wall 34, i.e. it is concave. This may further create a small pressure drop during operation of the separator, which in turn may decrease the risk of oil contaminating the clean gas entering the opening in the peripheral wall 23. The portion extending into the discharge chamber 22 further has a drainage hole 38, such that any oil that has entered the opening in the peripheral wall 23 may be drained from the hollow interior 36 out to the discharge chamber. The drainage hole is thus located downstream from the opening in the peripheral wall. The portion extending into the discharge chamber 22 further comprises fastening means 35 such that it may be securely fastened in the centrifugal separator, such as to the stationary casing 1 of the centrifugal separator.

Figures 5, 6:
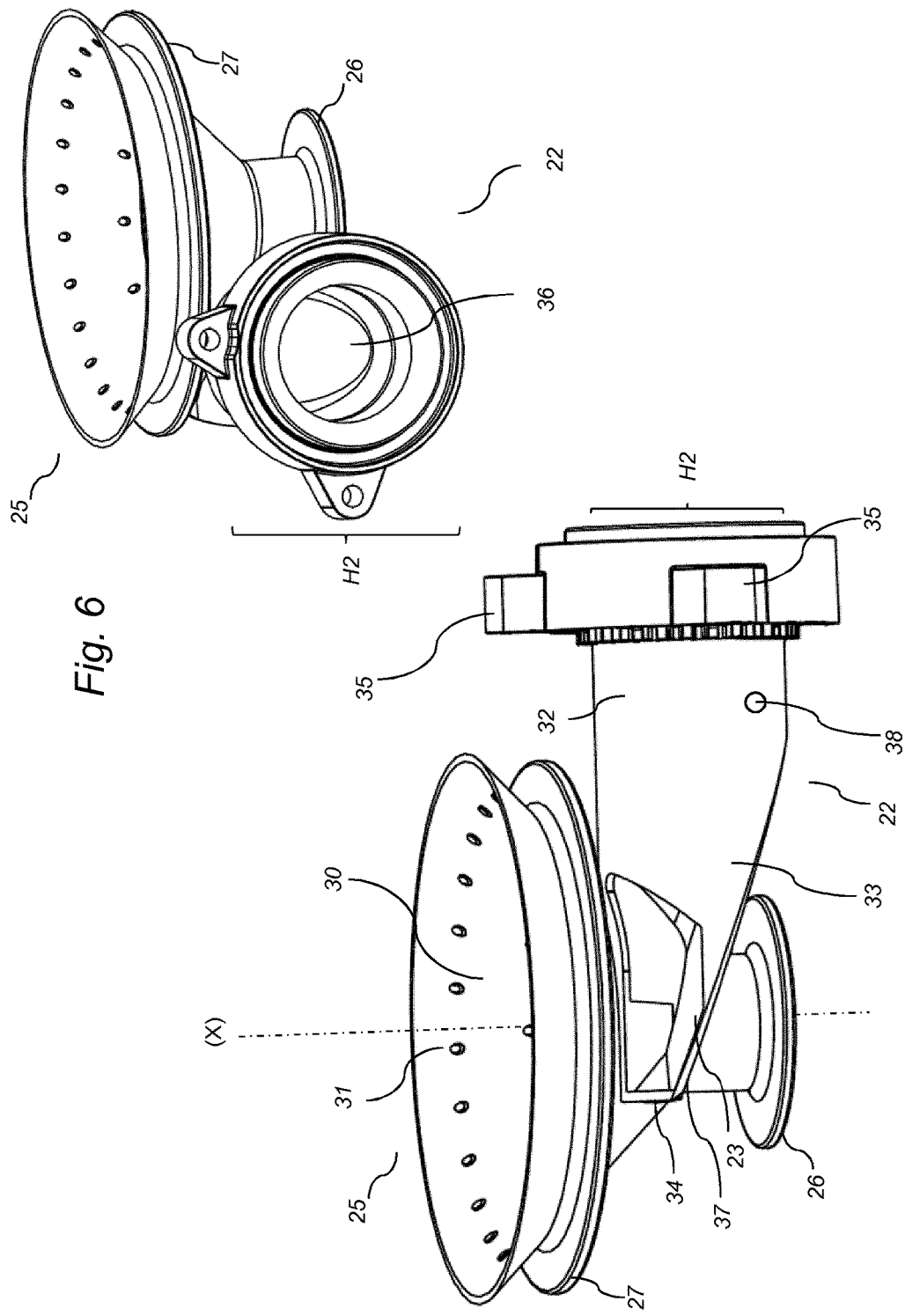
FIG. 5 shows a perspective view a portion extending into the discharge chamber arranged at a rotating secondary divider according to an embodiment of the present disclosure.
FIG. 6 shows a perspective view a portion extending into the discharge chamber arranged at a rotating secondary divider according to an embodiment of the present disclosure.

FIG. 5 and FIG. 6 further show the relation between the single unit 25 and the portion extending into the discharge chamber 22 of the gas outlet when arranged in the centrifugal separator. The axial height H2 of the portion extending into the discharge chamber is less than the axial distance between the lower flange 26 and the upper flange 27. As an example, the axial height H2 may be between 50 and 95% of the axial distance between the lower flange 26 and the upper flange 27, such a about between 80 and 95% of the axial distance between the lower flange 26 and the upper flange 27. This means that the axial height of the portion extending into the discharge chamber covers most of the axial length of the discharge chamber portion 12 from which the separated liquid impurities and the clean gas is discharged. Further, FIG. 5 shows that the opening in the peripheral wall 23 faces away axially upwards from the single unit 25, and that the portion extending into the discharge chamber 22 extend with its narrowing part 33 into the stationary casing 1 such that gas may be retrieved close to the centre of the stationary casing. FIG. 6 shows that the portion extending into the discharge chamber 22 extends between the lower flange 26 and the upper flange 27, and that the upper flange 26 extend radially approximately to a distance such that is approximately equal to the radial distance to the opening in the peripheral wall 23, i.e. the upper flange 27 slightly "covers" the opening in the peripheral wall 23, thus functioning as a roof and thereby aiding in preventing liquid impurities from entering opening in the peripheral wall 23 to the interior 36 of the portion extending into the discharge chamber 22.

FIG. 7a-d shows a few examples of separation discs that may be used in a centrifugal separator of the present disclosure. For clarity reasons, only a few discs are illustrated and it is to be understood that in reality, a larger number of discs are present so that the distance between the discs is much smaller.

Figure 7A:
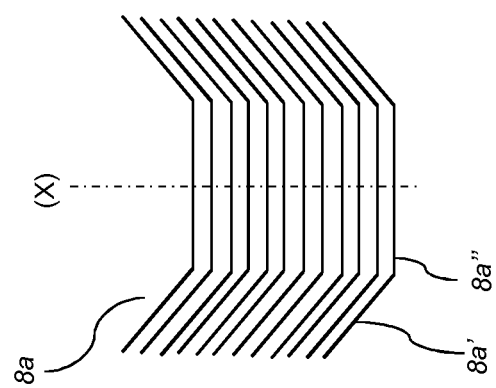
FIG. 7a-d show different types of separation discs that may be used in the centrifugal separator.

FIG. 7a shows an example of frustoconical discs 8a having a planar portion 8a" and a frustoconical portion 8a'. The planar portion 8a" extends in a plane that is perpendicular to the axis of rotation (X), and the frustoconical portion 8a' extends in this embodiment upwards. The planar portion 8a" is closer to the rotational axis than the frustoconical portion 8a'.

Figure 7B:
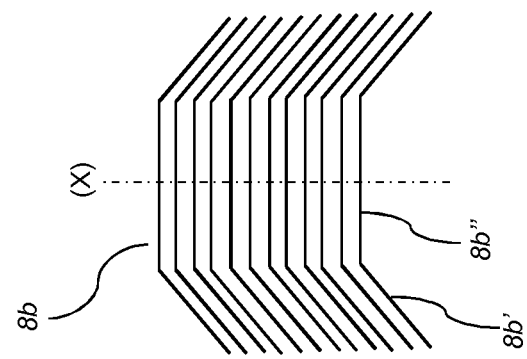

FIG. 7b shows an example of frustoconical discs 8a having a planar portion 8b" and a frustoconical portion 8b'. The planar portion 8b" extends in a plane that is perpendicular to the axis of rotation (X), and the frustoconical portion 8b' extends in this embodiment downwards. The planar portion 8b" is closer to the rotational axis than the frustoconical portion 8b'.

Figure 7C:
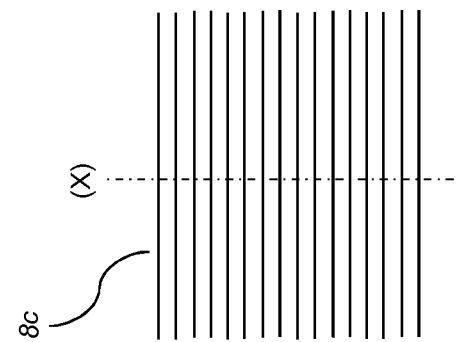

FIG. 7c shows an example of a disc stack in which all discs 8c are planar, i.e. all discs 8c extend in the plane that is perpendicular to the axis of rotation (X).

Figure 7D:
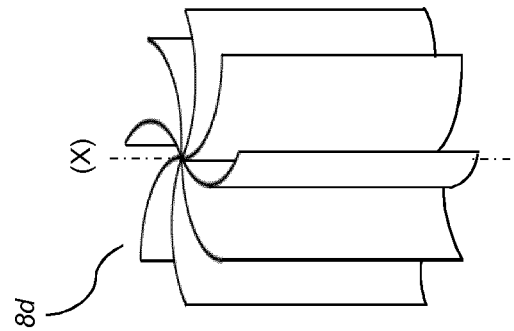

FIG. 7d shows an example of axial discs or plates 8d. These plates are slightly curved, i.e. they have a curved shaped as seen in a radial plane. In other words, they are curved as seen in a plane that is perpendicular to the axis of rotation (X).

The invention is not limited to the embodiment disclosed but may be varied and modified within the scope of the claims set out below. The invention is not limited to the orientation of the axis of rotation (X) disclosed in the figures. The term "centrifugal separator" also comprises centrifugal separators with a substantially horizontally oriented axis of rotation.

The invention claimed is:

1. A centrifugal separator for cleaning a gas containing liquid impurities, comprising:
   a stationary casing comprising a surrounding side wall, a first end wall and a second end wall, the surrounding side wall and the first and second end walls enclosing a space through which a gas flow is permitted, said space comprising an upper separation chamber and a lower discharge chamber;

an inlet extending through the stationary casing and permitting supply of the gas to be cleaned to the separation chamber;

a rotating member comprising a stack of separation discs and being arranged to rotate around an axis of rotation, wherein the stack of separation discs is arranged in the separation chamber;

a drive member for rotating the rotating member, wherein said lower discharge chamber is arranged axially below the stack of separation discs such that clean gas and separated liquid impurities both enter said lower discharge chamber after being separated in said stack of separation discs;

a gas outlet configured to permit discharge of cleaned gas from said stationary casing, wherein the gas outlet comprises an outlet opening through the stationary casing and a portion extending from the outlet opening into the lower discharge chamber, the portion having an inlet opening spaced from the outlet opening; and a drainage outlet arranged in said lower discharge chamber and configured to permit discharge of separated liquid impurities from said stationary casing, wherein the rotating member further comprises a lower flange arranged axially below said portion of the gas outlet extending from the outlet opening into the lower discharge chamber.

2. The centrifugal separator according to claim 1, wherein said lower flange is arranged axially between the drainage outlet and said portion of the gas outlet extending from the outlet opening into the lower discharge chamber.

3. The centrifugal separator according to claim 1, wherein the rotating member further comprises an upper flange arranged axially between the portion of the gas outlet extending into the lower discharge chamber and the disc stack.

4. The centrifugal separator according to claim 3, wherein the inlet opening is under the upper flange and within an outer circumference of the upper flange.

5. The centrifugal separator according to claim 1, wherein the rotating member further comprises a frustoconical portion onto which said disc stack is arranged.

6. The centrifugal separator according to claim 1, wherein said portion of the gas outlet extending from the outlet opening into the lower discharge chamber is hollow and comprises a peripheral wall and an opening in the peripheral wall through which the cleaned gas is retrieved and directed to said outlet opening through the stationary casing.

7. The centrifugal separator according to claim 6, wherein said portion of the gas outlet extends into the stationary casing such that said opening in the peripheral wall is located on a radius from rotational axis that is less than half of the total radius of the stationary casing.

8. The centrifugal separator according to claim 6, wherein said opening in the peripheral wall faces the rotational axis.

9. The centrifugal separator according to claim 6, wherein said opening in the peripheral wall faces away from said rotational axis.

10. The centrifugal separator according to claim 9, wherein said opening in the peripheral wall is directed in a direction that is approximately 45 degrees relative the rotational axis.

11. The centrifugal separator according to claim 6, wherein said portion of the gas outlet extending from the outlet opening into the lower discharge chamber comprises a tubular part and a narrowing part, wherein said tubular part is arranged at said outlet opening through the stationary casing and said narrowing part comprises said opening in the peripheral wall and wherein said narrowing part is arranged further away from said outlet opening through the stationary casing compared to said tubular part.

12. The centrifugal separator according to claim 11, wherein said narrowing part comprises and end wall extending in a plane formed by the rotational axis and the radius from the rotational axis.

13. A method for cleaning a gas containing liquid impurities comprising the steps of:

providing the centrifugal separator according to claim 1;

introducing gas containing liquid impurities into the inlet of said centrifugal separator; and discharging clean gas through said gas outlet and discharging liquid impurities separated from the gas through said drainage outlet.

14. The method according to claim 13, wherein said gas containing liquid impurities is crankcase gas of a combustion engine and said liquid impurities comprises oil.

15. The centrifugal separator according to claim 1, wherein the rotating member further comprises an upper flange arranged axially between the portion of the gas outlet extending into the lower discharge chamber and the disc stack.

16. The centrifugal separator according to claim 1, wherein the portion has a tubular sidewall and an end wall, and wherein the inlet opening is formed in the tubular sidewall.

17. The centrifugal separator according to claim 1, further comprising a drainage hole in the portion between the inlet opening and the outlet opening.

18. The centrifugal separator according to claim 1, further comprising an outlet conduit extending outwardly from the outlet opening.

* * * * *